Patented June 4, 1940

2,203,505

UNITED STATES PATENT OFFICE 2,203,505

QUATERNARY AMMONIUM COMPOUND

Henry Alfred Piggott and John Donald Rose, Blackley, Manchester, England, assignors to Imperial Chemical Industries Limited, a corporation of Great Britain No Drawing. Application June 10, 1938, Serial No. 213,081. In Great Britain June 11, 1937

7 Claims. (Cl. 260—294)

This invention relates to the manufacture of new quarternary ammonium compounds which are also mono-substituted derivatives of urea.

According to the invention we obtain the said new quarternary ammonium compounds by causing a urea of the general formula

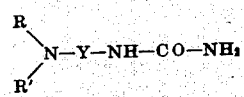

wherein R and R' stand for the same or different alkyl, cycloalkyl or aralkyl radicals, or the grouping

as a whole stands for the radical of a heterocyclic secondary base, for example, piperidine, morpholine or tetrahydroquinoline, and Y stands for the group —CH$_2$—CH$_2$ or for an arylene group, to interact with a reactive ester derived from a monohydric or polyhydric aliphatic or araliphatic alcohol and an inorganic acid or an organic sulphonic acid. Suitable esters are, for example, ethylene chlorohydrin, benzyl chloride, methyl chloride, dimethyl sulphate, and ethyl p-toluenesulphonate.

In carrying the invention into practical effect the urea is heated with the reactive ester alone or in a suitable solvent or diluent, e. g. an alcohol.

The products obtained are compounds of the general formula

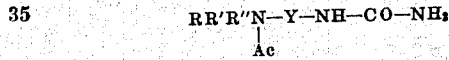

where RR' and Y have the significance given above, and R" and Ac stand for the groups or atoms which taken together form the reactive ester. These compounds are readily soluble in water. They are useful for textile treatment purposes.

The invention is illustrated but not limited by the following examples in which the parts are by weight.

Example 1

20 parts of 4-dimethylaminophenylurea (see Berichte der deutschen chemischen Gesellschaft 1879, 12, 536) and 15 parts of dimethyl sulpate are dissolved in 15 parts of methanol. The solution is slowly heated to boiling and boiled in a vessel provided with a reflux condenser for about half an hour. The solution is then cooled. Its own volume of acetone is added. When the so-diluted solution is allowed to stand p-dimethylaminophenylurea methosulphate crystallises. The colourless crystals are filtered off and dried. The new compound has M. P. 186–187° C. The reaction involved in making this new compound may be illustrated by the following equation:

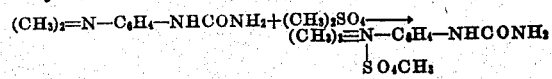

Example 2

10 parts of β-dimethylaminoethylurea (see British Patent 497,042) and 15 parts of methyl iodide are mixed and the mixture is heated at 50–60° C. until no more crystals separate. The mixture is cooled and filtered. The crystals are washed with cold ethanol and dried. There is thus obtained trimethyl-β-ureidoethylammonium iodide in the form of a white, crystalline, neutral solid, which is hygroscopic and which dissolves in water to give a colourless solution. The reaction involved in making this new compound may be illustrated by the following equation:

(CH$_3$)$_2$=NCH$_2$CH$_2$NHCONH$_2$+CH$_3$I ⟶
(CH$_3$)$_3$≡NCH$_2$CH$_2$NHCO H
 |
 I

Example 3

15.5 parts of β-piperidylethylurea are dissolved in 20 parts of ethanol and 12.5 parts of dimethylsulphate are added. A vigorous reaction occurs with evolution of heat. When the reaction has subsided, the mixture is heated to 100° C. for ½ hour. It is then cooled and acetone is added, whereupon an oil separates out. This is separated off and well washed with dry acetone, whereupon it crystallises, forming a white solid. This is then recrystallised from a mixture of acetone and alcohol. There is thus obtained β-piperidylethylurea methosulphate in the form of white crystals of M. P. 216° C. The reaction involved in making this new compound may be illustrated by the following equation:

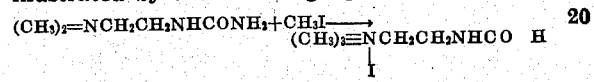

Example 4

30 parts of β-piperidylethylurea are dissolved in 50 parts of ethanol and 21.5 parts of 1:4-dibromo-butene-2 are added and the solution so-obtained is heated at 100° C. for ½ hour. Acetone is then added, whereupon a white solid is precipitated. This is filtered off and recrystallised from aqueous ethanol. There is thus obtained [1:4-bis(N - β -ureidoethylpiperidyl)-butene-2] dibromide in the form of white crystals, M. P. 226° C. with decomposition.

Example 5

15 parts of β-piperidylethylurea and 8 parts of ethylene chlorhydrin are heated together at 100° C. for 6 hours in a vessel provided with a reflux condenser. The reaction mixture is then cooled and acetone is added, whereupon an oil separates out. This is separated off and is then allowed to stand in a closed vessel containing phosphorus pentoxide. The oil gradually crystallises. There is thus obtained β-ureidoethyl-β-hydroxyethyl-piperidinium chloride in the form of white hygroscopic crystals.

*Example 6*

43 parts of dibutylaminoethylurea and 25 parts of benzyl chloride are heated together at 100° C. for 16 hours. The mixture is then allowed to cool whereupon it crystallises. There is thus obtained β-ureidoethyl dibutyl benzyl ammonium chloride in the form of colourless hygroscopic crystals which are readily soluble in water.

*Example 7*

20 parts of dibutylaminoethylurea and 20 parts of methyl iodide are heated together for 24 hours in a steam-jacketed vessel provided with a reflux condenser. The mixture is then cooled, water is added and the aqueous solution so obtained is washed with ether. The ether layer is rejected and the aqueous solution is evaporated to dryness. There is thus obtained methyl β-ureidoethyl dibutyl ammonium iodide in the form of colourless hygroscopic crystals which are readily soluble in water. The reaction involved in making this new compound may be illustrated by the following equation:

(C₄H₉)₂=NCH₂CH₂NHCONH₂+CH₃I ⟶

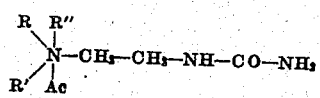

We claim:

1. A quaternary ammonium compound of the formula:

wherein the grouping

as a whole stands for the radical of a secondary amine selected from the group consisting of heterocyclic secondary bases and secondary amines in which R and R' represent radicals selected from the category consisting of alkyl radicals, cycloalkyl radicals, and aralkyl radicals, R" stands for a radical selected from the group consisting of aliphatic radicals and aralkyl radicals, and Ac represents an anion of an acid selected from the group consisting of inorganic acids and organic sulphonic acids.

2. A process for the manufacture of new quaternary ammonium compounds which comprises causing a urea of the general formula:

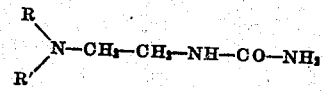

wherein the grouping

as a whole stands for the radical of a secondary amine selected from the group consisting of heterocyclic secondary bases and secondary amines in which R and R' represent radicals selected from the category consisting of alkyl radicals, cycloalkyl radicals, and aralykyl radicals, to interact with a reactive ester derived from an alcohol selected from the class consisting of aliphatic alcohols and araliphatic alcohols and an acid selected from the group consisting of inorganic acids and organic sulphonic acids.

3. A quaternary ammonium compound of the formula:

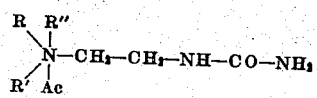

wherein R and R' each represent alkyl radicals, R" stands for a radical selected from the group consisting of aliphatic radicals and aralkyl radicals, and Ac represents an anion of an acid selected from the group consisting of inorganic acids and organic sulphonic acids.

4. A quaternary ammonium compound of the formula:

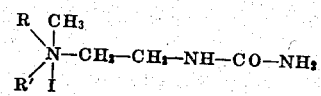

wherein R and R' each represent alkyl radicals.

5. A quaternary ammonium compound of the formula:

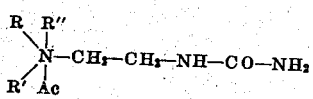

wherein the grouping

as a whole stands for the radical of a heterocyclic secondary base selected from the group consisting of piperidine, morpholine, and tetrahydroquinoline, R" stands for a radical selected from the group consisting of aliphatic radicals and aralkyl radicals, and Ac represents an anion of an acid selected from the group consisting of inorganic acids and organic sulphonic acids.

6. Beta piperidylethylurea methosulphate which has the formula

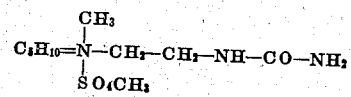

7. Trimethyl beta-ureidoethyl ammonium iodide which has the formula

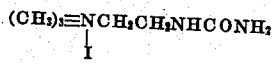

HENRY ALFRED PIGGOTT.
JOHN DONALD ROSE.